United States Patent [19]

Meckley

[11] Patent Number: 5,062,142

[45] Date of Patent: Oct. 29, 1991

[54] DATA PROCESSOR PRODUCING A MEDIAL AXIS REPRESENTATION OF AN EXTENDED REGION

[75] Inventor: John R. Meckley, Voorhees, N.J.

[73] Assignee: General Electric Company, Moorestown, N.J.

[21] Appl. No.: 627,453

[22] Filed: Dec. 14, 1990

[51] Int. Cl.⁵ .............................................. G06K 9/56
[52] U.S. Cl. ....................................... 382/27; 382/28
[58] Field of Search .................................. 382/27–28, 382/48, 8

[56] References Cited

U.S. PATENT DOCUMENTS

| | | | |
|---|---|---|---|
| 4,603,430 | 7/1986 | Sacks | 382/28 |
| 4,736,439 | 4/1988 | May | 382/27 |
| 4,797,806 | 1/1989 | Krich | 382/27 |
| 4,979,221 | 12/1990 | Perryman et al. | 382/48 |

Primary Examiner—Stephen Brinich
Attorney, Agent, or Firm—Raymond E. Smiley

[57] ABSTRACT

The medial axis representation of an image stored in an input memory is created in an output memory using only a moving 3-pixel by 3-pixel window to "view" the stored image. The medial axis contains no breaks.

4 Claims, 11 Drawing Sheets

| PASS | COL. PRESET VALUE | COL. UP/DOWN | X SEL. | ROW PRESET VALUE | ROW UP/DOWN | Y SEL. | WRITE OFFSET |
|---|---|---|---|---|---|---|---|
| 1 FOR EACH INCREASING ROW (Y) INCREMENT THRU ALL COL. (X) | 0 | UP | HIGH SPEED | 0 | UP | SLOW SPEED | -513 |
| 2 FOR EACH INCREASING ROW (Y) DECREMENT THRU ALL COL. (X) | 511 | DOWN | HIGH SPEED | 0 | UP | SLOW SPEED | -511 |
| 3 FOR EACH INCREASING COL. (X) INCREMENT THRU ALL ROWS (Y) | 0 | UP | SLOW SPEED | 0 | UP | HIGH SPEED | -513 |
| 4 FOR EACH INCREASING COL. (X) DECREMENT THRU ALL ROWS (Y) | 0 | UP | SLOW SPEED | 511 | DOWN | HIGH SPEED | +513 |

DATA PROCESSOR PRODUCING A MEDIAL AXIS REPRESENTATION OF AN EXTENDED REGION

BACKGROUND OF THE INVENTION

1. Field of Invention

This invention is concerned with producing a medial axis representation of a two-dimensional binary image, and more particularly with producing such representation at speeds much greater than heretofore possible using a general purpose serial processor without having breaks in the medial axis.

2. Description of the Prior Art

It is often necessary or desirable to represent a binary stored elongate image having widths on the order of perhaps five or ten picture elements (pixels) by a medial axis of just one pixel wide along the center of the image. If the original image approximates a line-like structure, the medial axis representation thereof retains the important geometrical aspects even though it is only one pixel in width. A medial axis representation of a solid figure such as a rectangle or a triangle is not indicative of the original shape but the medial axis approach is not intended for such a structure.

The medial axis representation is a useful data structure for data compression, date presentation, and as input for additional processes that can deduce important morphological relationships between the constituent parts of the image. Some example uses are for reduction in data transmission costs over communication links due to the format compression, electronic representation of cartographic elevation data from original transducers such as video cameras, seismic detectors, and sonar arrays. In the prior art algorithms for creating a medial axis of an image required analyzing many pixels at once and then sometimes created breaks in the medial axis.

SUMMARY OF THE INVENTION

A method for creating the medial axis in an addressable output memory of an image stored as 1 valued picture elements (pixels) in an addressable input memory, each of said memories arranged functionally as rows and columns, comprises the following steps.

1. Initializing a 9-pixel data window, arranged in 3 rows each of 3 columns, to an initial location with respect to the input memory at one corner thereof to view the data at 9 associated locations in said input memory and resetting a delete latch.

2. Moving the window in a first pass to successive locations in a first direction with respect to the input memory, such as to successive columns of a first row and then to successive columns of successive rows.

3. Moving the window in a second pass to successive locations in a second direction opposite to said first direction such as to successive columns in a first row and then to successive columns in successive rows.

4. Moving the window in a third pass in a third direction normal to said first direction such as to successive rows of a first column and then to successive rows of successive columns.

5. Moving the window in a fourth pass to successive locations in a fourth direction opposite to said third direction such as to successive rows in a first column and then to successive rows in successive columns.

6. At each location, determining whether the value of the window center pixel, that is the pixel in the second row and second column of 9 window pixels, has the value 1 and the previous value of that pixel in the direction of window travel has the value 0.

7. If the answer to the question in step 6 is "no", proceeding to step 8.

8. Determining whether the Window has been moved through all four cycles in steps 2, 3, 4, and 5.

9. If the answer to the question in step 8 is "no", continuing movement of the window in the direction it was going at the time step 6 was being implemented and proceeding to step 6.

10. If the answer to the question in step 6 is "yes", determining the number of pixels in the window, excluding the center pixel, known as the neighbors, which are of value 1 (Sum 1) and the number of neighbor pairs which are unequal in value (Sum 2).

11. If the value of Sum 1 is 1 or the value of Sum 2 is equal to or greater than 4, writing a value 1 to the output memory at the address location corresponding to the location of the center pixel in the input memory and proceeding to step 8.

12. If the value of sum 1 is unequal to 1 and the value of sum 2 is less than 4, determining whether the value of the output memory at the address location of the center pixel in the window is a value 1;

13. If the answer to the question in step 1 is "no", writing a value 0 to the input memory at the address of the center pixel, setting the delete latch to indicate that a bit was deleted in input memory and proceeding to step 8.

14. If the answer to the question in step 12 is "yes", proceeding to step 8.

15. If the answer to the question in step 8 is "yes", determining whether said delete latch in step 13 is set.

16. If the answer to the question in step 15 is "yes", proceeding to step 1.

17. If the answer to the question in step 15 is "no", stopping whereby the output memory contains the medial axis representation of the scene in the input memory.

BRIEF DESCRIPTION OF THE DRAWING

FIGS. 4-1, 4-2, 4-3, and 4-4 illustrate how a data window is conceptually moved over the binary stored image in FIG. 1;

FIGS. 5-1 thru 5-20 are a timed sequence of the steps in creating a medial axis representation of the image of FIG. 1;

FIGS. 6-1 thru 6-20 are a timed sequence of steps of loading an output memory with medial axis pixels for the example of FIG. 2;

DETAILED DESCRIPTION OF THE DRAWING

Figure 1:
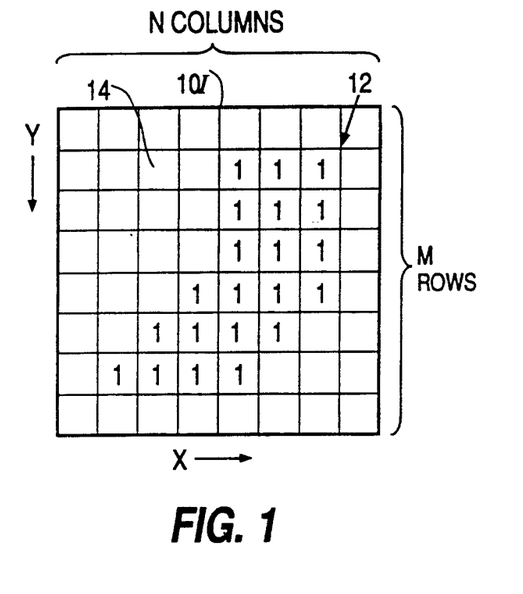
FIG. 1 is a binary stored image of an exemplary object.

FIG. 1, to which attention is now directed, is a memory array 10I comprising M rows by N columns containing a binary image representation 12 of an object as represented by the plurality of 1's in various ones of the memory locations (boxes). It should be understood that, although in FIG. 1, M and N are each 8, a more typical value for each of M and N is 512. Each of the blocks, such as 14, is termed a picture element or pixel. Thus, there are three 1-valued pixels in row 2 columns 5, 6, and 7. Pixels which do not have the value 1 have the value 0, but to aid in drawing clarity, the 0-valued pixels are not illustrated in FIG. 1.

Figure 2:
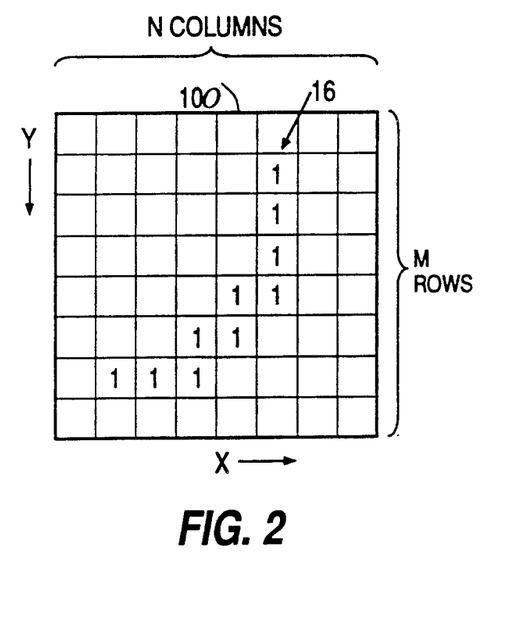
FIG. 2 is a medial axis representation of that image.

Referring to FIG. 2, the medial axis representation 16 of binary image representation 12 is illustrated in memory 100. It will be noticed that the medial axis representation is essentially one pixel in width. The only exception is where the original object or portion of the original object lies at an angle and there two pixels represent that portion of an object. This is exemplified by row 5 and row 6.

Figure 3:
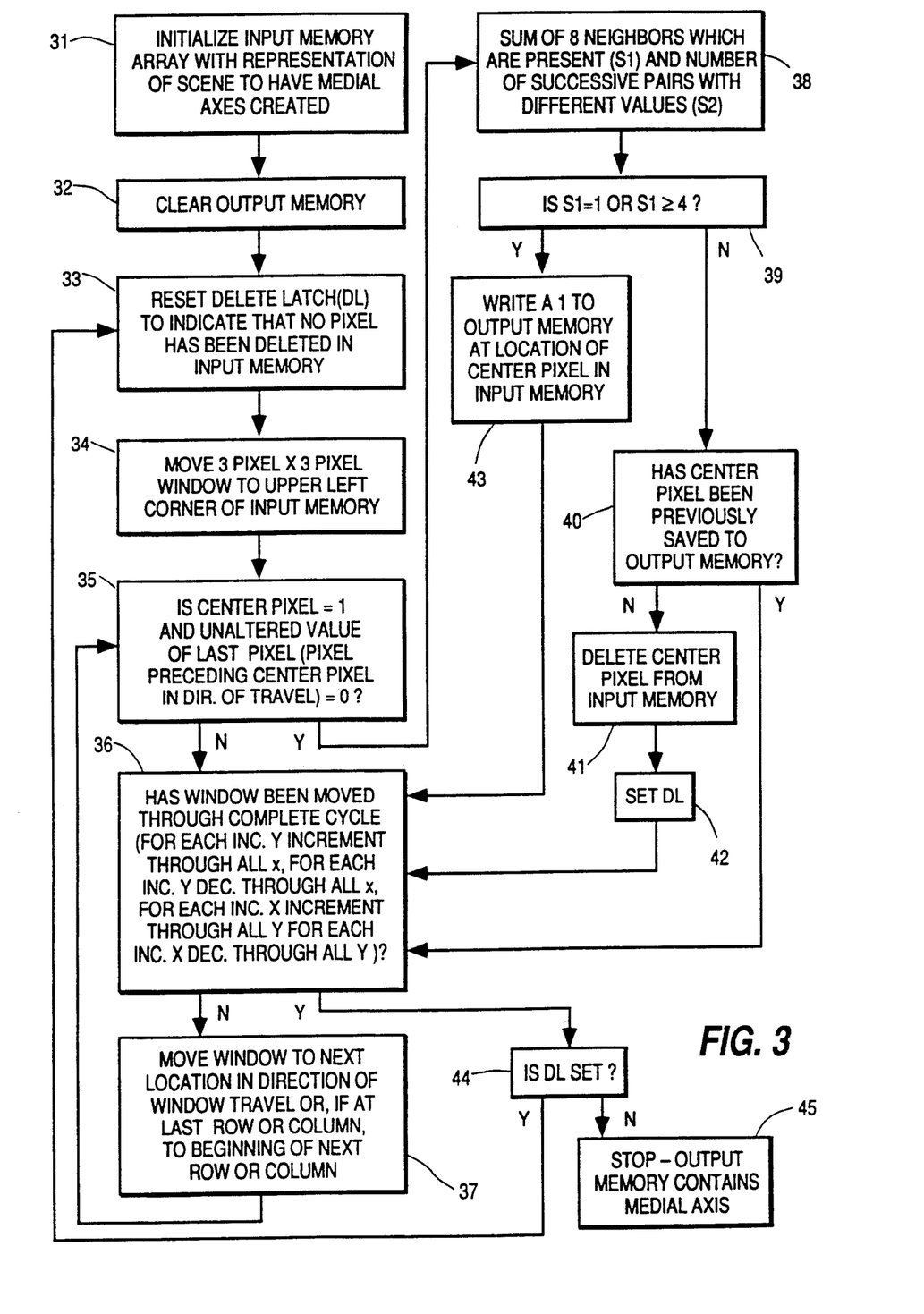
FIG. 3 is a flow chart of the medial axis creation of a binary represented image.

FIG. 3 is a flow chart illustrating the operation of the invention to create a medial axis representation such as that illustrated in FIG. 2 from a binary representation such as that illustrated in FIG. 1. The flow chart description involves the concept of a moving window that is three pixels by three pixels in size.

The window is illustrated in various ones of FIG. 4, to which attention is now directed. It makes four passes through the memory, the four passes comprising one cycle. As illustrated in FIG. 4-1 the window 20 is first moved from left to right (the X direction) to successive columns and then to successive columns of successive rows increasing in the Y direction. This is pass 1 as illustrated in FIG. 4-2, window 20 is next moved in the direction of decreasing columns of each successively increasing row (pass 2). As illustrated in FIG. 4-3, the window 20 is next moved in the direction of increasing rows and then to increasing successive columns (pass 3). Finally, in FIG. 4-4, window 20 is moved in the direction of decreasing rows and then in decreasing rows of successively increasing columns (pass 4).

Figure 41:
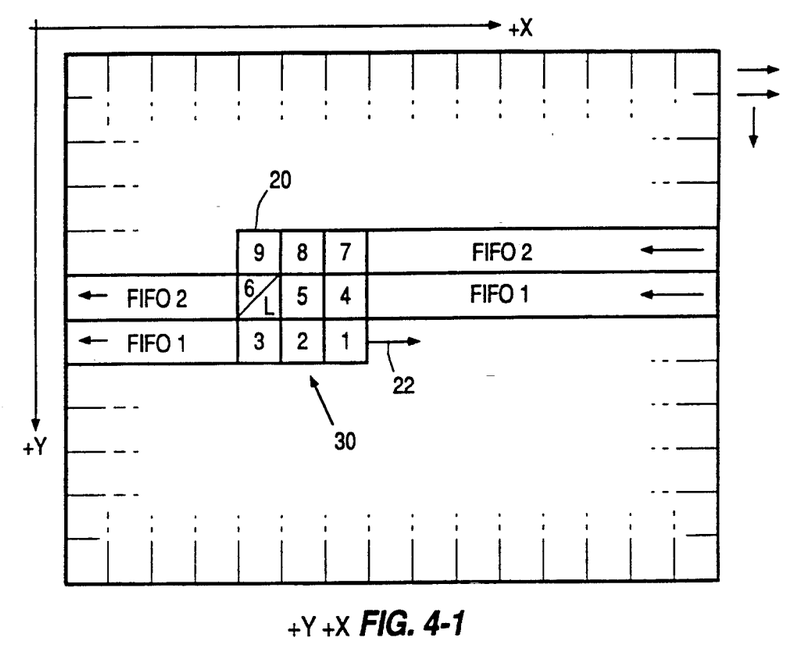
Figure 42:
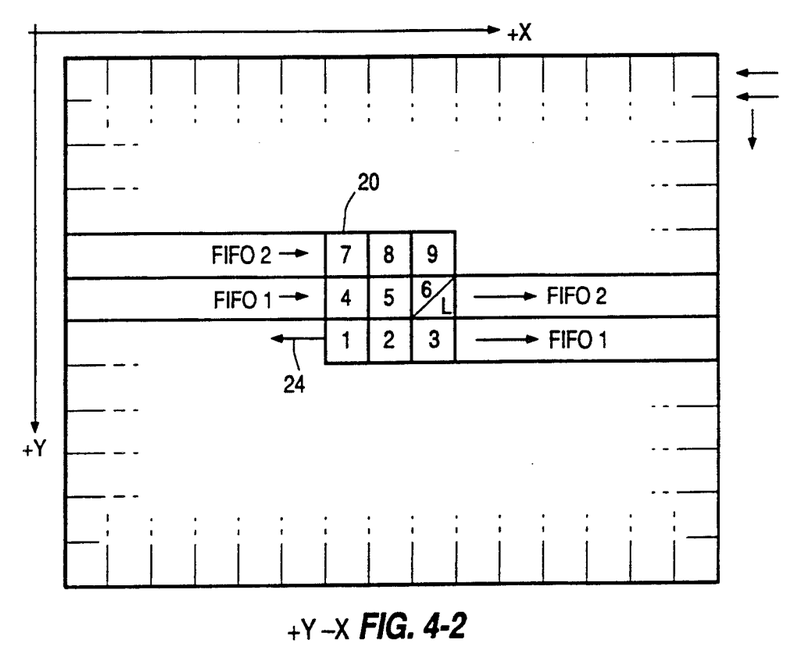
Figure 43:
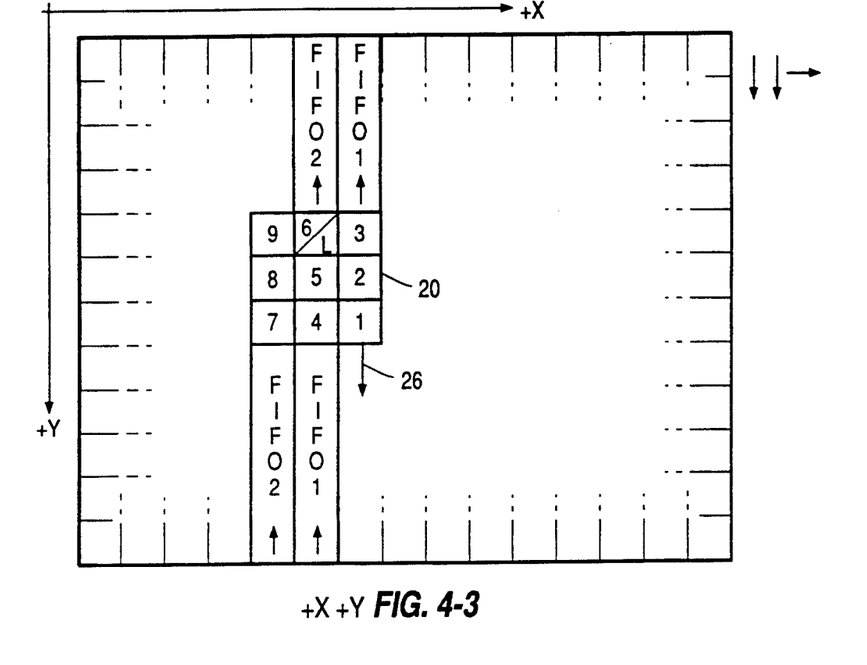
Figure 44:
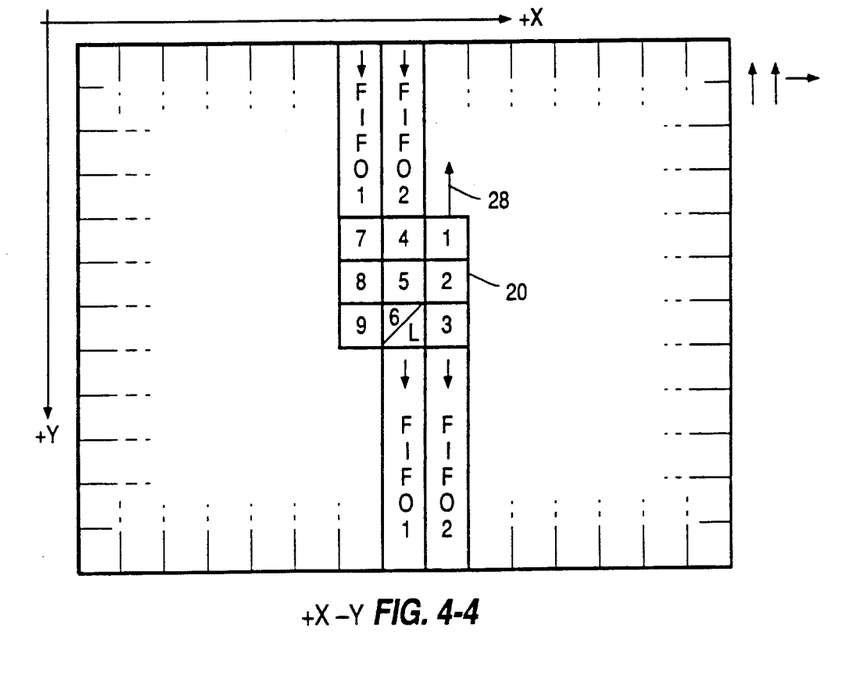

Structurally, window 20 is part of a larger first-in-first-out (FIFO) buffer 30. In the case of a memory such as that illustrated in FIG. 1 where N and M are identical, buffer 30 is of length 2N+3. The pair comprises three latches numbered 1, 2, and 3 in window 20 followed by a first-in-first-out buffer 1 (FIFO1), followed by latches 4, 5, 6, and L (LAST), followed by FIFO2, followed by latches 7, 8, and 9 in window 20. Each of FIFO1 and FIFO2 is n-3 pixels in length. As window 20 is moved in the direction of arrow 22 the next pixel in memory is moved into latch 1 and all other information contained in buffer 30 is moved along the buffer such that what was in latch 9 is discarded.

The LAST or latch L and latch 6 need some further explanation. Information at the location of latch 5 is sometimes altered, as will be hereinafter described from a 1 value to a 0 value. When the information in latch 5 is moved, the original value of latch 5 is moved into latch L while the current (perhaps altered) value of latch 5 is moved into latch 6. As will be noticed from a review of FIGS. 4-2, 4-3, and 4-4, the physical positions of the various latches is determined by the direction of travel of the window. It will be understood from a review of FIG. 4-1 for example that when window 20 is in the upper left hand corner of the figure that latch 5 is in the second column and second row. As will be more fully described hereinafter, it is that pixel which will be changed. Because of this arrangement it is necessary to have an upper and lower pixel row and left and right pixel column which contain no usable information. This is known as a 1-pixel frame.

Referring back to FIG. 3, in block 31 the input memory 10I, FIG. 1, is loaded with a binary image representation of a scene. The scene may represent one object or many objects and thus have one image or many images. In FIG. 1 only one object is represented. Concurrently or subsequently, the output memory 100 is cleared to an all-zero state (block 31). It will ultimately contain the medial axis or axes of the image or images in FIG. 1. Also currently or subsequently, a delete latch DL (block 33) is reset to indicate that no pixels have yet been deleted in input memory 10I. Further, concurrently or subsequently, the window described in connection with FIG. 4, i.e., any of FIGS. 4-1, 4-2, 4-3, or 4-4 is moved to the upper left corner of the input memory (block 34), it being understood that the idea of a moving window is conceptual in nature. What has thus far been described in connection with FIG. 3 is all in the nature of initialization. The actual steps of determining the pixels which make up the medial axis commence with block 35. In this connection attention is now directed to various ones of FIG. 5, that is, FIGS. 5-1 thru 5-20.

Figure 53:
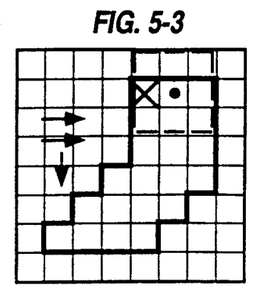

In the various FIGS. 5 the moving window is depicted as a dashed box. A dot indicates the location of the central pixel in that window. The object representation is outlined rather than denoted as a series of 1 values and deleted pixels, as will be described hereinafter, are indicated by the letter X. Thus for example, in FIG. 5-3 the pixel at row 2 column 5 has been deleted.

It should be understood that FIG. 5 illustrates input memory 10I of FIG. 1 at various points in time as the window 20 illustrated in FIG. 4 is moved as described in connection with FIG. 4. Thus, in FIG. 3 block 35 is a question "Is center pixel=1 and unaltered value of last pixel (pixel preceding the center pixel in the direction of travel)=0)?" The reason that the last pixel value refers to an unaltered value is that pixel 5, the center pixel, is in accordance with what is to be described hereinafter sometimes altered by deletion so it is necessary to know what that value was before alteration (deletion) for the algorithm to be described to function properly.

Figure 51:
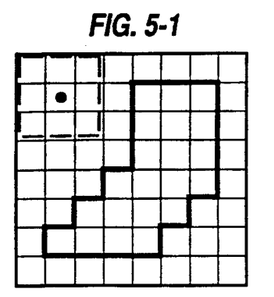

In FIG. 5-1 the value of center pixel, that at row 2 column 2, is not a 1 value and as such the answer to the question posed in block 35 is "NO". The outputs from block 35 and various other blocks with questions are denoted by the letters N for NO and Y for YES. Since the answer to the question posed in block 35 is NO, with regard to FIG. 5-1, flow continues to the next block 36 which asks another question "Has window been moved thru a complete cycle?" (that is, the cycle illustrated in the four figures of FIG. 4). Here, in FIG. 5-1 the answer to that question is also NO, so the flow proceeds to block 37 which is a command to move the window to the next location in the direction of window travel or, if at the last location of a row or column, to move it to the beginning of the next row or column. Then the flow proceeds back to block 35.

Figure 52:
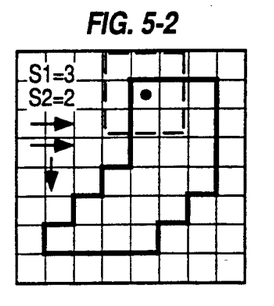

The first location at which anything of consequence occurs is that illustrated in FIG. 5-2, where the center pixel indicated by the X is in row 2 column 5, which is the upper left corner of the image. Thus, in block 35 the center pixel does have a value 1 and the last pixel being outside the object representation does have a value 0 so that the answer to the question posed in block 35 is YES. Therefore, the flow proceeds to block 38 which calls for two sums to be generated. Sum 1 (S1) is the sum of the window elements excluding the center pixel which have the value 1. In FIG. 5-2, S1=3 and that is indicated in the upper left corner of the figure. That is, in row 2 column 6 has the value 1 and in row 3 columns 5 and 6 each have the value 1. The second sum (S2) is the total of all successive pairs of values in the window, again excluding the center pixel value, which are of different value. In the case of FIG. 5-2, S2=2, because the pixels at row 3 column 4 and row 3 column 5 are of different values and the pixels at row 1 column 6 and row 2 column 6 are of different values.

Figure 62:
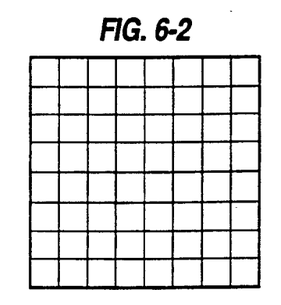
Figure 63:
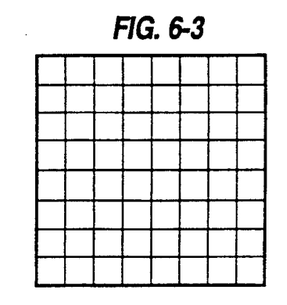
Figure 64:
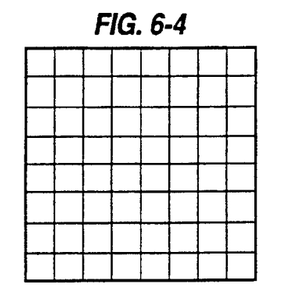
Figure 65:
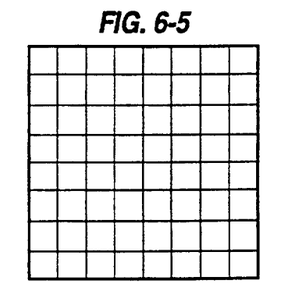

The flow next proceeds to block 39 which asks the question "Is S1=1 or S2≧4?" Since the answer is NO, the flow next proceeds to block 40 which asks the question "Has center pixel been previously saved to output memory?" A review of FIG. 6-2 which is the output memory corresponding in time with the input memory in FIG. 5-2 reveals that no pixel has yet been saved in output memory. Since the answer to the question is NO, flow next proceeds to block 41 which calls for deleting the center pixel from the input memory and setting delete latch (DL) 42, which indicates that a pixel has been deleted from input memory. The flow next proceeds to block 36, which is answered in the negative since the window has not reached the right edge of the memory as illustrated in FIG. 5-2.

Figure 54:
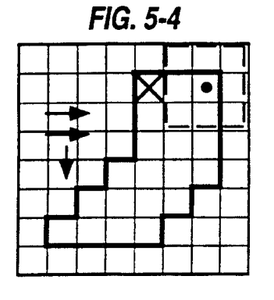

Thus, in accordance with block 37, the window is moved to the next location as illustrated in FIG. 5-3 and the hash marks at row 2 column 5 indicate that that location has been deleted, i.e. changed from a value 1 to a value 0. The flow next proceeds back to block 35. Here the value of the center pixel is equal to 1 and, in fact, the value of the preceding pixel in the direction of window travel, that at row 2 column 5, is a 0, but block 35 checks for the value of the last pixel, that is, the value of the pixel just preceding the center pixel before alteration. In this case, that pixel before alteration contained the value 1 and as such the answer to the question posed in block 35 is NO. Thus, the value of input memory at row 2 column 6 is left at value 1 and the window is moved to the next location to the right, that is, the location as illustrated in FIG. 5-4. Here, the answer to the question posed in block 35 is NO and the answer to the question posed in block 36 is NO.

Figure 55:
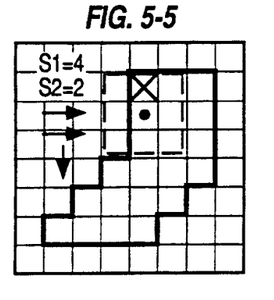

Thus in accordance with the instructions in block 37 the window is moved down one row and back to the far left. That particular location is not illustrated in any of the FIGS. 5. As the window moves across it will come to the position illustrated in FIG. 5-5 where the answer to the question posed in block 35 is YES. As such, the pixel in location row 3 column 6 is deleted, that is, changed from a value 1 to a value 0.

Figure 56:
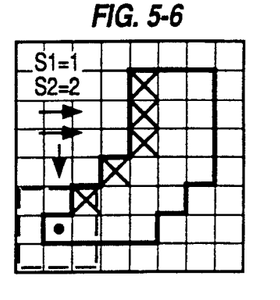
Figure 57:
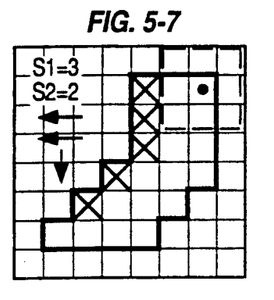
Figure 58:
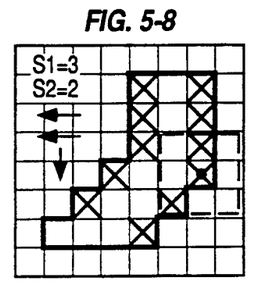
Figure 59:
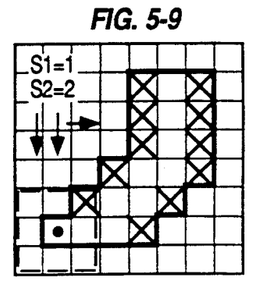
Figure 61:
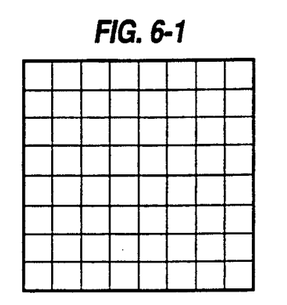
Figure 66:
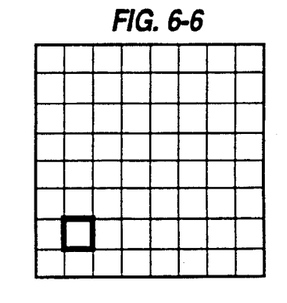
Figure 67:
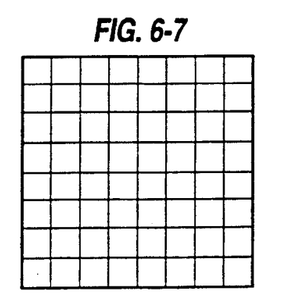
Figure 68:
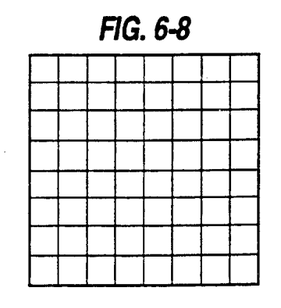
Figure 69:
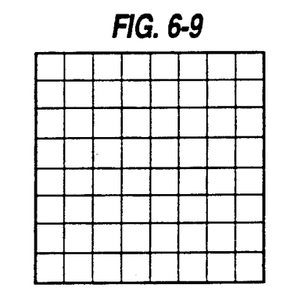
Figure 510:
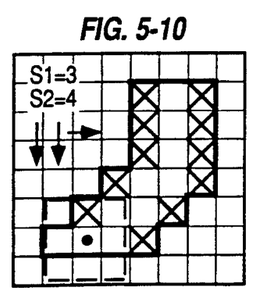
Figure 511:
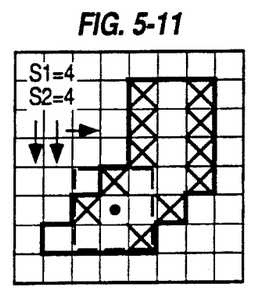
Figure 512:
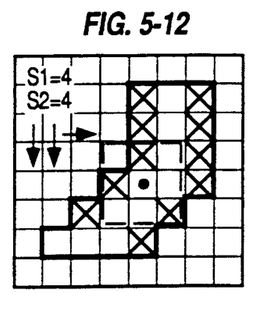
Figure 513:
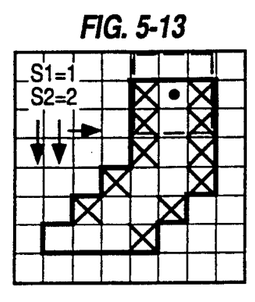
Figure 514:
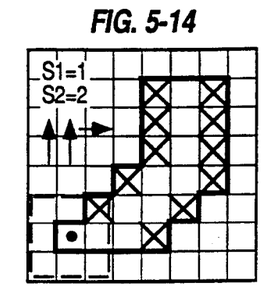
Figure 515:
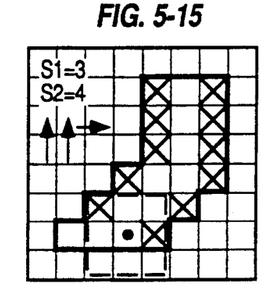
Figure 516:
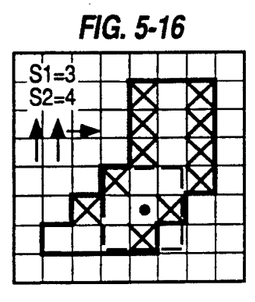
Figure 517:
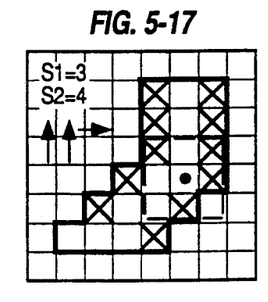

Eventually, the window will be moved to the location illustrated in FIG. 5-6, that is, to the lower left corner of the memory. Here the answer to the question posed in block 35 is YES, the answer to the question posed in block 39 is similarly YES since S1=1. As such, the flow proceeds to block 43. In accordance with the command in block 43, a 1 value is written to an output memory at the location of the center pixel in block 5-6. This is as illustrated in FIG. 6-6.

In FIG. 5-7 the direction has reversed, as indicated by the arrows under the sums, and the window is positioned in the upper right corner of the memory, all is indicated by the command in block 37 of FIG. 3. It should be noted in connection with FIG. 6-7 that no block is illustrated, although it was illustrated as having been added in FIG. 6-6. The reason for this is that it is thought that to not show blocks where none are being added more prominently brings out those times when blocks are in fact added. Thus, the next block added is as a result of the placement in FIG. 5-10. It should be noted in connection with FIG. 5-10 that the window is moving from top to bottom in each successive column as indicated by the arrows beneath the sums. Between FIGS. 5-17 and 5-18 the direction of travel of the window has completed all four passes of the first cycle and is now moving from left to the right across subsequent rows in the first pass of the second cycle.

Figure 518:
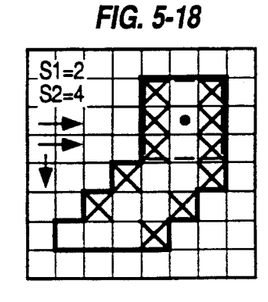
Figure 519:
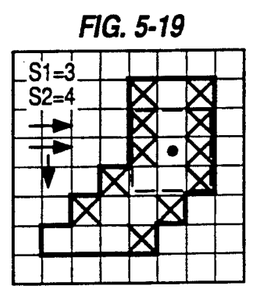
Figure 520:
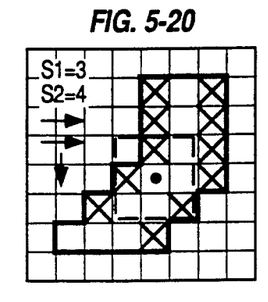
Figure 610:
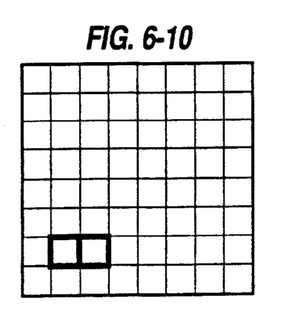
Figure 611:
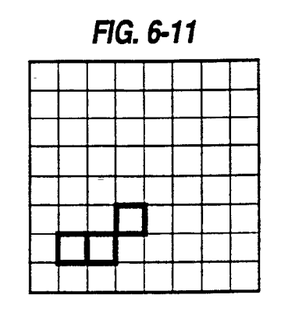
Figure 612:
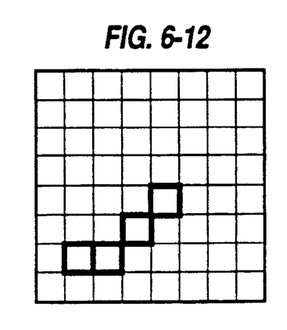
Figure 613:
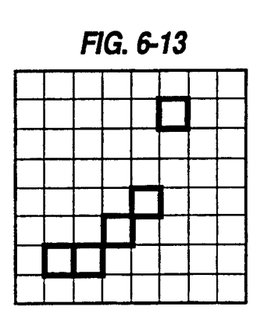
Figure 614:
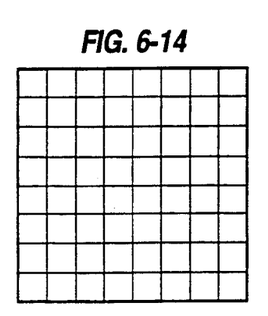
Figure 615:
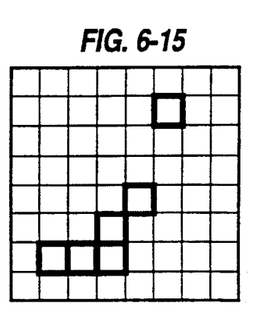
Figure 616:
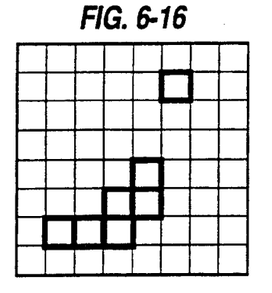
Figure 617:
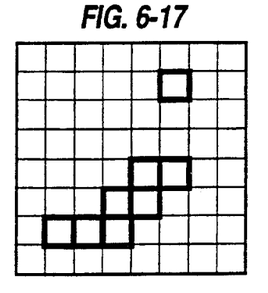
Figure 618:
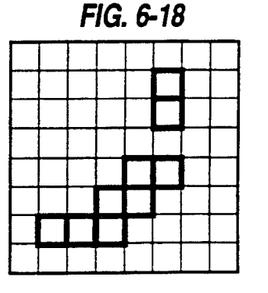
Figure 619:
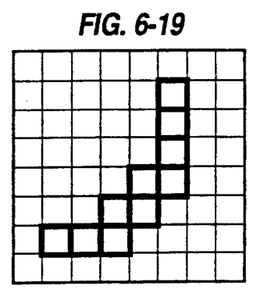
Figure 620:
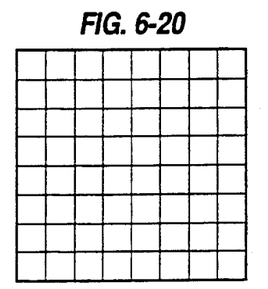

At the time that the window was in the upper right corner having travelled from bottom to top, the answer to question 36 is YES. That causes flow to proceed to block 44 which asks the question "Is DL set?" The answer to that question is YES and thus flow proceeds to block 33 which causes DL to be reset and the window to be moved to the upper left corner of the memory. In FIG. 5-18 the center pixel has a value 1 while the pixel to its left, the last pixel, has a value 0 and thus the answer to the question posed in block 35 is a YES and furthermore S2=4. Thus, flow proceeds from block 35 through blocks 38 and 39 and 43 back to block 36 and a pixel is written in output memory as indicated in FIGS. 6-18 at row 3 column 6. No pixel is deleted during the entire four passes of the second cycle over the input memory and as such when the window passes from bottom to top at the right side of the memory and thus the question posed in block 36 is answered affirmatively, the answer in block 44 is NO and the flow proceeds to block 45 which indicates that the process of determining the medial axis is complete and that the output memory contains that medial axis. Actually the medial axis was complete in FIG. 6-19, but the system has no way to determine this until it makes a complete pass through all four passes of the cycle.

Figure 7:
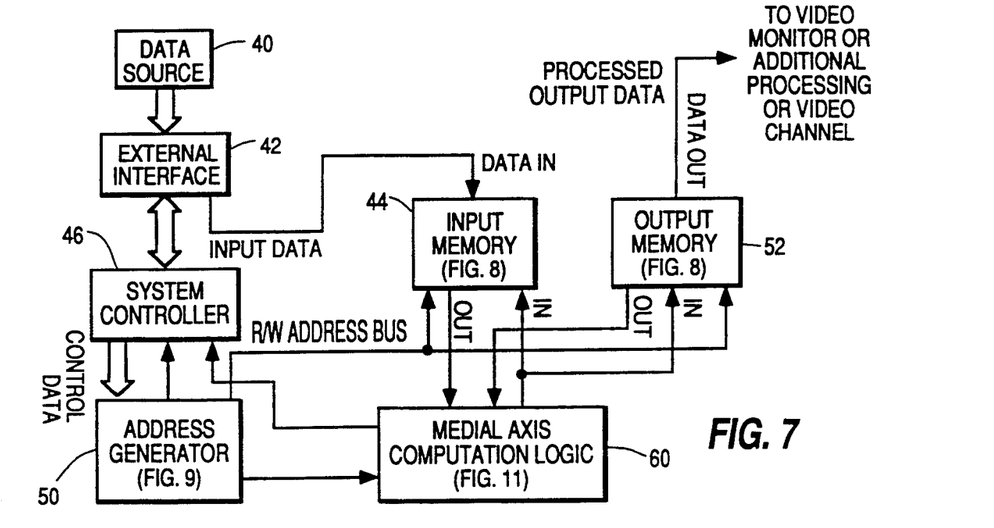
FIG. 7 is a system diagram in block form for a medial axis creation data processor.

FIG. 7, to which attention is now directed, is the system for producing medial axes in accordance with the present invention. In FIG. 7 data source 40, of conventional design, is the source of the information for which medial transformation is desired. It may be an electronic data generator, such as a computer, or a raster scan device scanning real objects with conversion to a binary signal or any other source of digital information which can be stored as a binary pattern of 1's and 0's in a memory array. As was mentioned earlier, the medial transformation works best with objects which are elongated in nature and on the order of five or ten pixels in width, but that is a practical, not theoretical, limitation. The output of data source 40 is directly or, more typically, via a data bus (not shown) coupled to an external interface unit 42 which is of conventional design and provides signal level shifts and required timing to operate properly with whatever data bus system is involved.

The output of external interface 42 is coupled to the data input terminal of an input memory 44 similar to memory 10I, FIG. 1. Memory 44 functionally stores M rows by N columns of single bit data, where M and N are each, by way of example, 512, but which are illustrated in FIGS. 1, 2, 5, and 6 as 8 and 8. The memory ideally is of the type which has the ability to be read from and written into at different addresses simultaneously and must be bit addressable. The output of external interface 42 is also bi-directionally coupled to a system controller 46 which provides timing signals and controls initial loading of the object representation into memory 44. The output of system controller 46 is coupled to an address generator 50 which provides addresses for input memory 44, an output memory 52, and indirectly to external interface 42 via system controller 46 to which an output of address generator 50 is coupled. Address generator 50 will be described in greater detail in connection with FIG. 9 to be discussed hereinafter. Controller 46 initializes the system by clearing memory 52, then loads new information into memory 44, preloads information into address generator 50 and provides system timing and control signals including high speed clock signals.

Output memory 52 similar to memory 100 in FIG. 2 is identical in specification to input memory 44. The only exception from memory 44 being that theoretically the one-pixel-wide frame that was previously described which necessarily contains no information in input memory 44 is not necessary in output memory 52, but as a practical matter, it is more economical to provide that unused memory than to develop a special and unique memory for output memory 52.

Each of input memory 44 and output memory 52 is connected via a data out line to a medial axis computation logic 60. The output of medial axis computation logic 60 connects to the data input line of each of memories 44 and 52. A greater description of medial axis computation logic 60 will be given in connection with FIG. 11 to be discussed hereinafter. Output memory 52, after medial axis transformation has occurred, contains the medial axis or axes of the information contained in input memory 44. The output of output memory 52 is, by way of example, coupled to a video monitor or additional processing equipment which is not of concern in connection with the instant invention.

Figure 8:
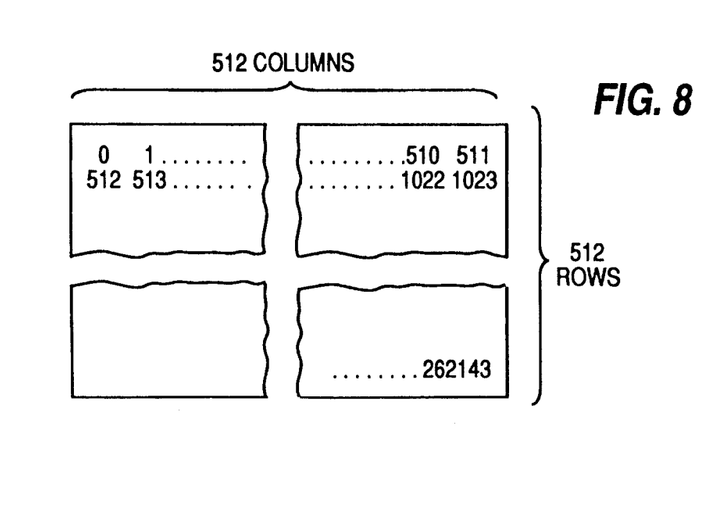
FIG. 8 illustrates how the various storage locations in an exemplary memory are linearly addressed.

FIG. 8 illustrates the arrangement of an exemplary input memory 44 and output memory 52 (FIG. 7). The number 512 for rows and columns is exemplary but is typical. FIG. 8 shows the address scheme for such a memory. The first row first column address (upper left corner) is 0, the first row last column address (upper right corner) is 511, the second row first column address is 512, and the last row last address (lower right corner) is 512×512−1 or 262143.

Figure 9:
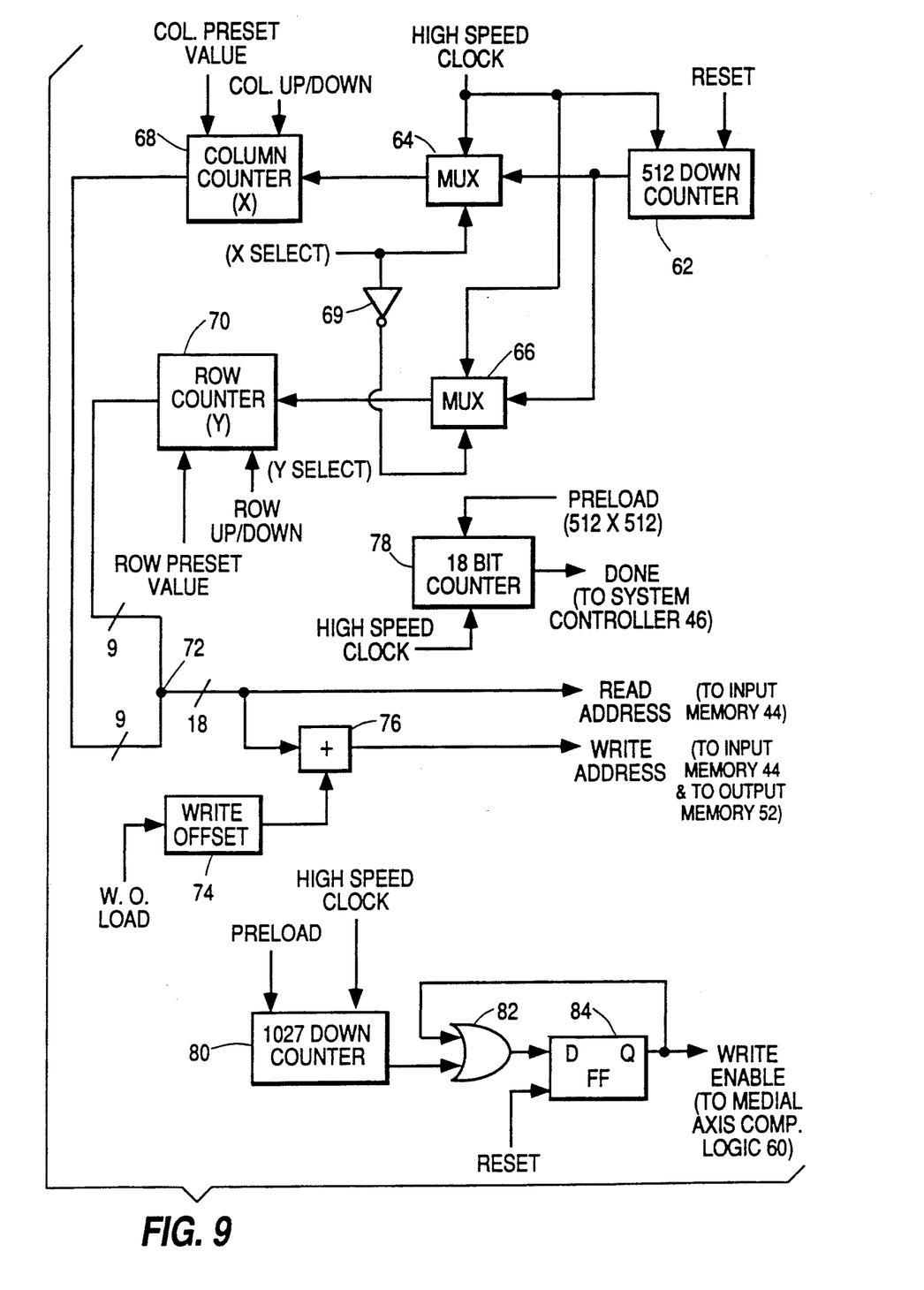
FIG. 9 is the logic in block diagram form for the addressing portion of the system of FIG. 7.

FIG. 9 is an addressing logic for addressing the input and output memories 44 and 52, respectively. All inputs to the various elements in FIG. 9 are from the system controller 46 FIG. 7. In FIG. 9 a 512 down counter (nine bit) 62 is reset to a count of 511 at the start of each pass through memory 46; the passes being as illustrated in the various FIGS. 4. A high-speed clock signal (HS) decrements the counter as each bit is read from memory 44. When counter 62 reaches a 0 count, it resets automatically back to a count of 511 and as it does so it produces a momentary output pulse. Thus, counter 62 produces an output pulse for each 512 HS pulses input to it. The output of counter 62 and HS are coupled to respective inputs of multiplexers 64 and 66. The output of multiplexer 64 is coupled to the clock or counter input of a 9-bit (512 count) column counter 68. The output of multiplexer 66 is coupled to the clock or counter input of a 9-bit (512 count) row counter 70.

Figure 10:
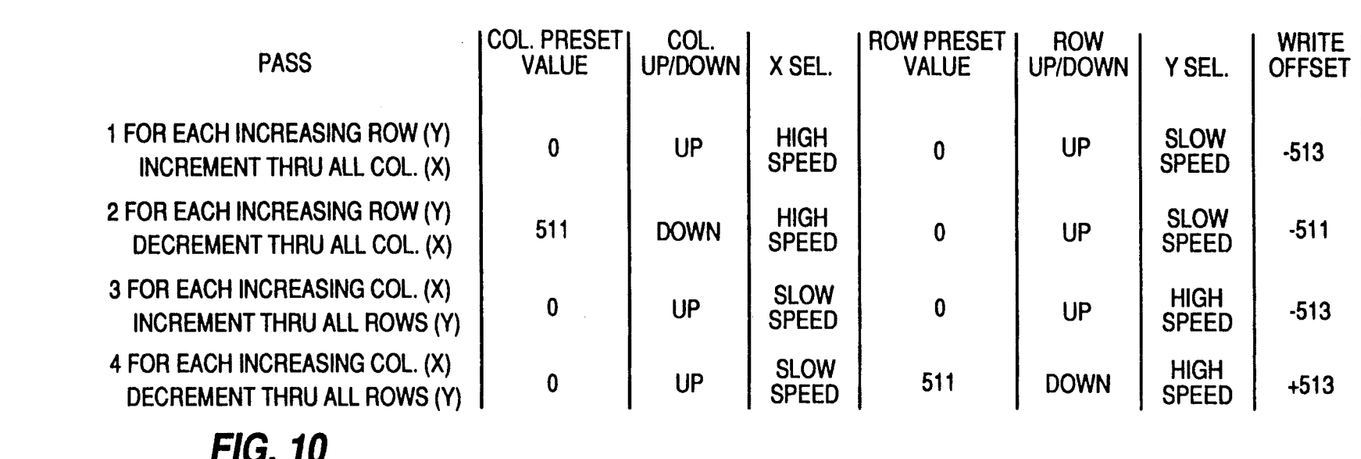
FIG. 10 is a table of values which are supplied to various elements in FIG. 9.

At the beginning of each pass the column and row counters are preset in accordance with values in TABLE 1, FIG. 10, and counters are preset to count up or down also in accordance with the values in TABLE 1. Further, the X select value as set forth in the table is supplied to multiplexer 64 to determine which input, HS or 512 down counter, is passed to column counter 68. The X select value is also supplied via inverter 69 to multiplexer 66 which therefore determines whether HS or 512 down counter is applied to row counter 70. Because of inverter 69, it is clear that when HS is supplied to one of the counters 68 and 70, the 512 down counter output (slow speed count) is supplied to the other of those two counters.

The outputs of counters 68 and 70 are combined at node 72 to produce an 18-bit address which is supplied to the address input of memory 44. Numbers such as the numbers 9 on the outputs of counters 68 and 70 and 18 on the line exiting from node 72 indicate the number of data channels therein present.

Also at the beginning of each pass a write offset value is input to write offset latch 74 as set forth in TABLE 1. The output of write offset latch 74 is added to the output of node 72 in adder 76. The output of adder 76 is connected to the address input of both input memory 44 and output memory 52.

At the start of each pass an 18-bit counter 78 is preloaded with the value 512×512−1 (262143) and down counted by each HS pulse. When the counter reaches 0, the next HS pulse causes it to "underflow" back to count of 262143 and to produce a momentary "done" output pulse. The "done" output pulse (logic 1 or logic 0) is sent to system controller 46 (FIG. 7) to indicate the end of one pass and the start of the next pass. Counter 80 is preloaded with a count of 1027 or 512+512+3 at the start of each pass and is down counted by HS. The output of counter 80 is coupled to one input of an OR gate 82. The output of OR gate 82 is coupled to the D input of a D-type flip-flop 84. The Q output of flip-flop 84 is coupled to a second input of OR gate 82 to ensure that flip-flop 84, once set remains so until the reset pulse is supplied thereto. The Q output is also applied to the write enable input of medial axis computation logic 60 (FIG. 7). A reset pulse is applied to flip-flop 84 to reset it at the beginning of each pass. The net effect of components 80, 82, and 84 is to inhibit writing into output memory 52, FIG. 7, until buffer 30, FIG. 4 is preloaded with the first 1027 pixels from input memory 44, FIG. 7, that is, two rows plus three pixels of the third row.

Figure 11:
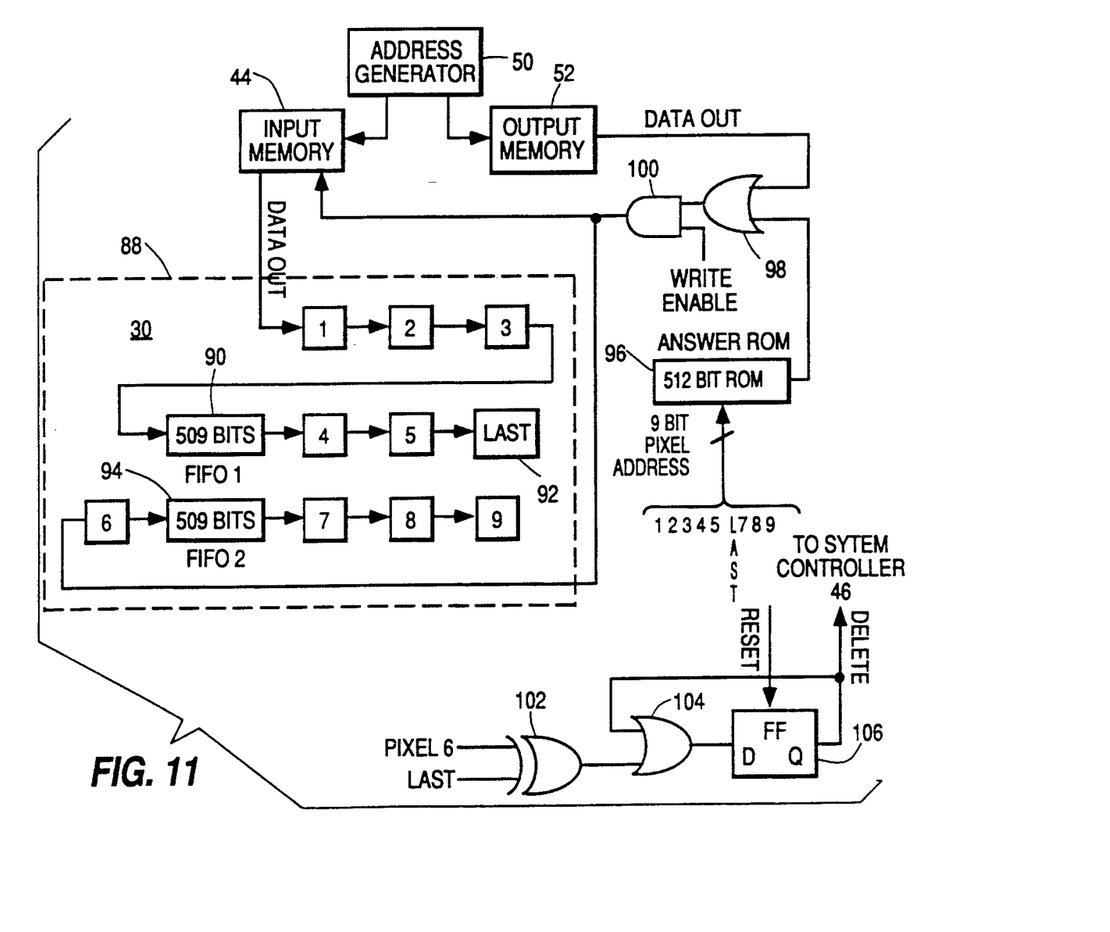
FIG. 11 is the medial axis computation logic in block form of the system of FIG. 7.

Buffer 30 and associated logic comprising the medial axis computation logic is illustrated in FIG. 11 to which attention is now directed. It will be understood that for convenience in describing the operation of FIG. 11, address generator 50, input memory 44 and output memory 52 of FIG. 7 are also illustrated in FIG. 11. In FIG. 11 buffer 30 comprises the elements within dashed line 88. The buffer consists of, in series, three latches numbered 1, 2, and 3, a first-in-first-out buffer (FIFO1) 90 which holds 509 bits, latches numbered 4 and 5, and a LAST latch 92. Then there is a discontinuity which will be explained hereinafter then a latch numbered 6, a second first-in-first-out buffer (FIFO2), and three latches numbered 7, 8, and 9. The numbers 1, 2 ... 8, 9, and last correspond to the window positions illustrated in FIGS. 4-1 thru 4-4. The latches 1, 2, 3, 4, 5, last, 7, 8, and 9 are each coupled to a 512-bit ROM 96 which is termed in "Answer ROM" because it, in effect, determines whether bit 5 is a 1 and last is a 0, and, if so, whether sum 1 is a 1 and sum 2 is equal or greater than 4 all as described in connection with the flow chart of FIG. 3. Answer ROM 96 is typically implemented as a look-up table in known fashion. Answer ROM 96 produces an output when pixel 5 is a 1 and LAST is a 0 and then only when S1=1 or S2≧4, all as outlined in connection with the discussion of FIG. 3. In all other combinations Answer ROM 96 produces a 0 value. The output of ROM 96 is coupled to one input of OR gate 98.

The output of that OR gate is coupled to one input of an AND gate 100. The second input to AND gate 100 is the write enable signal from flip-flop 84 (FIG. 9). The write enable signal is a logic 0 until 1027 bits have been passed through buffer 30 (FIG. 11). Thereafter write enable is a logic 1 so whatever value is produced at the output of OR gate 98 is passed through AND gate 100. The output of AND gate 100 is connected to latch 6 of FIFO 30 and to the data-in ports of input memory 44 and output memory 52. It will be remembered from an earlier discussion that each of input memory 44 and output memory 52 is a two-port memory enabling it to be read from and written into simultaneously at the same or different addresses. There is an output line from output memory 52 to the second input of OR gate 98. The purpose of that line is to ensure that a previously saved pixel in output memory 52 is not deleted even if the output of Answer ROM 96 is a 0. The LAST and pixel 6 (the value at any time in the LAST latch 92 and latch 6 of buffer 30) are provided as inputs to an exclusive OR gate 102. The output of exclusive OR gate 102 is coupled to the input of OR gate 104, the output of which is coupled to the D input of a D-type- flip-flop 106. The Q output of flip-flop 106 is coupled as a second input to OR gate 104 to ensure that the flip-flop remains set until a pulse is produced on the reset line and to provide a delete signal to system controller 46 to indicate that at least one pixel has been deleted from input memory 44 during a four-pass cycle of that memory. Flip-flop 106 is reset at the beginning of each cycle of four passes, as indicated in block 33 of FIG. 3 where flip-flop 106 is the equivalent of delete latch and thereafter at any time in the four-pass cycle that the value of pixel 6 and LAST differ flip-flop 106 is set.

The operation of FIGS. 7-11 is as follows. First with respect to FIG. 7, input memory 44 is loaded with a binary represented image or images, the medial axis or axes of which is to be determined. To avoid awkward phraseology, it will be assumed that there is one image and therefore one medial axis to be generated in the discussion which follows. Output memory 52 is cleared to all 0's and flip-flop 106, FIG. 11, is reset to indicate that no pixel has been deleted from input memory 44.

Then the values in FIG. 10, pass 1, are loaded into various elements in FIG. 9. Particularly, zero values are preloaded into column and row counters 68 and 70, respectively, and the counters are set to count up. Further, X select is set to a value such that HS pulses are directed to counter 68 via multiplexer 64 and the 512 down counter output pulses are directed to counter 70 via multiplexer 66. Write offset 74 is set to a value of −513. With the column counter at 0 and the row counter at 0, the contents of the zero address of memory 44, that is, the content of column 1 row 1 is read out and read into latch 1 of buffer 30, FIG. 11. After the first HS pulse, column counter 68 is advanced to a count of 1 to address memory 44 address 1, the value of latch 1 is transferred to latch 2, and the value at address 1 of memory 44 is written into latch 1. After two more HS pulses, the value of address 0 enters FIFO1. After more HS pulses when counter 68 reaches a count of 511 the right column of the first row of memory 44 is addressed and its value is read into latch 1, while the value at address 0 has reached the end of FIFO1. At the next HS pulse, counter 68 is incremented. However, since it has reached its maximum count (511), it is, in fact, effectively reset to a count of 0. At the same time counter 62 has reached a count of 0 and as such it "advanced" back to a count of 511 and output pulse therefrom via multiplexer 66 advances row counter 70 to a count of 1. Since row counter 70 produces the upper nine bits of the read address, the total read address is now 512. This process continues until 1027 bits have been read from input memory 44 into buffer 30. During this time write enable from the Q output of flip-flop 84, FIG. 9, being a logic 0 has disabled AND gate 100 so that in reality latches 6, 7, 8, 9, and 509-bit FIFO2 are all filled with 0's. It should be realized, however, that that is the value of the first row of input memory since, as previously mentioned, there is a one-pixel border filled with 0's around the outer edge of memory 44. With the buffer thus preloaded, testing of the various neighbor bits as previously described commences. That is, ROM 96 tests to see if the pixel in latch 5 is a 1. If pixel 5 is a 1 and LAST. that is the value of the last latch 92 is a zero, and if S1, the sum of values in all of latches 1, 2, 3 4, 5, 6, 7, 8, and 9 is 1 (sum S1) or the neighbor pairs which are different from one another as previously explained as being sum 2 is equal to or greater than 4, ROM 96 produces at its output a logic 1. In all other instances, that is, when the combination of latch 5 being equal to 1 and LAST being equal to 0 is false, or if true, that sum 1 is not equal to 1 and sum 2 is not equal or greater than 4, Answer ROM 96 produces a logic 0.

Also with reference to FIG. 9 it will be understood that the value in write offset 74 when added with the current read address in adder 76 produces a write address which is always at the location in input memory 44 that is currently in latch 5 or the center pixel of the 9-pixel window. That address is supplied by address generator 50 both to output memory 52 and input memory 44. Therefore, accordance with the signals fed to OR gate 98, if either output memory 52 contains a logic 1 at the address of pixel 5 or if the Answer ROM produces a logic 1 because the conditions above-outlined are met, then a 1 signal is passed from OR gate 98 to AND gate 100 and written into both memories at the pixel 5 address. As more HS pulses are produced, the input memory 44 is read from at the various successive locations along columns and down rows and 0's or 1 are written into the location of pixel 5 from the output of AND gate 100. If at any time pixel 6, that is, the bit in latch 6 and the bit in LAST differ in value, flip-flop 106 becomes set indicating that at least one bit was deleted from input memory 44 which, in effect, indicates that bits are still being deleted from the image contained therein.

When input memory 44 has been read from all columns in each successively increasing row 18-bit counter 78. FIG. 9, produces a done pulse which is transmitted to system controller 46, FIG. 7. As a result thereof, the information for pass 2 in the table of FIG. 10 is loaded into the various elements in FIG. 9 and the process above-described repeats. This time, however, column counter 68 is set to a value of 511 and that counter is set to count down. Thus, with each HS pulse input at multiplexer 64 column counter 68 decrements by a count of 1 which has the effect of reading out data from input memory 44 from high column numbers toward low column numbers. When column counter 68 reaches 0 it automatically "resets" to a count of 511 and the count down proceeds again as previously described.

After four passes of addressing in FIG. 9 as indicated in the table of FIG. 10 system controller 46, FIG. 7, checks to see if the output of flip-flop 106 is a logic 1 or a logic 0. If the output of flip-flop 106 is a logic 0, that is an indication that at least one bit has been deleted from input memory 44 and that the process above-described must be again repeated. If flip-flop 106 is still reset at the end of the four passes, this indicates that no bit was deleted from input memory 44 and furthermore that output memory 52 contains the medial axis of the image stored in binary form in input memory 44.

It should be understood that the size of the memory is not limited to a particular value, although as mentioned previously, 512 rows by 512 columns is a typical value. Furthermore, the passes do not necessarily have to be from right to left, left to right, top to bottom, and bottom to top, as indicated, but can be in other orders that will accomplish the same task of removing all bits of an image which are not necessary to form the medial axis thereof. Furthermore, the answer ROM 96, FIG. 11, need not be a lookup table, although that is perhaps the most practical way of carrying out the process. Thus, what has been presented is a system for rapidly determining the medial axis of a stored image.

What is claimed is:

1. A method for creating the medial axis in an addressable output memory of an image stored as 1 valued picture elements (pixels) in an addressable input memory, each of said memories arranged functionally as rows and columns, comprising the steps of:
   a. initializing a 9 pixel data window, arranged in 3 rows each of 3 columns, to an initial location with respect to said input memory at one corner thereof to view the data at 9 associated locations in said input memory and resetting a delete latch:
   b. moving said window in a first pass to successive locations in a first direction with respect to said input memory;
   c. moving said window in a second pass to successive locations in a second direction different from said first direction;
   d. moving said window in a third pass in a third direction different from said first direction and different from said second direction;
   e. moving said window in a fourth pass to successive locations in a fourth direction different from said first, second and third directions;
   f. at each location, providing a "yes" answer if the value of the window center pixel, that is the pixel in the second row and second column of 9 window pixels, has the value 1 and the previous value of that pixel in the direction of window travel has the value 0 and otherwise producing a "no" answer;
   g. if the answer in step f. is "no", proceeding to step h.;
   h. providing a "yes" answer if said window has been moved through all four cycles in steps b., c., d. and e. and otherwise providing a "no" answer;
   i. if the answer in step h. is "no", continuing movement of the window in the direction it was going at the time step f. was being implemented and proceeding to step f.;
   j. if the answer in step f. is "yes", determining the number of pixels in the window, excluding the center pixel, known as the neighbors, which are of value 1 (Sum 1) and the number of neighbor pairs which are unequal in value (Sum 2);
   k. if the value of Sum 1 is 1 or the value of Sum 2 is equal to or greater than 4 writing a value 1 to said output memory at the address location corresponding to the location of said center pixel in said input memory and proceeding to step h.;
   l. if the value of sum 1 is unequal to 1 and the value of sum 2 is less than 4, providing a "yes" answer if the value of said output memory at the address location or the center pixel in the window is a value 1 and otherwise providing a "no" answer;
   m. if the answer in step l. is "no", writing a value 0 to the input memory at the address of the center pixel, setting said delete latch to indicate that a bit was deleted in input memory and proceeding to step h.;
   n. if the answer in step l. is "yes", proceeding to step h.;
   o. if the answer in step h. is "yes", providing a "yes" answer if determining said delete latch in step m. is set and otherwise providing a "no" answer;
   p. if the answer in step o. is "yes", proceeding to step a.; and
   q. if the answer in step o. is "no", stopping whereby the output memory contains the medial axis representation of the scene in the input memory.

2. The combination as set forth in claim 1 wherein:
   step b. comprises moving said window in a first pass to successive locations in a first direction with respect to said input memory, such as to successive columns of a first row and then to successive columns of successive rows, and wherein;
   step c. comprises moving said window in a second pass to successive locations in a second direction opposite to said first direction such as to successive columns in a first row and then to successive columns in successive rows, and wherein;
   step d. comprises moving said window in a third pass in a third direction normal to said first direction such as to successive rows of a first column and then to successive rows of successive columns, and wherein;
   step e. comprises moving said window in a fourth pass to successive locations in a fourth direction opposite to said third direction such as to successive rows in a first column and then to successive rows in successive columns.

3. Apparatus for creating a medial axis of an image, comprising in combination:
   an addressable input memory means functionally arranged in rows and column orthogonal to said rows, the information stored in each row and column intersection, being termed a location, said memory storing said image as a plurality of pixels of a first value in various ones of said locations and for storing a second value in all other locations;
   an addressable output memory means substantially identical to said input memory for storing said medial axis of said image when created, said output memory initially cleared to all 0's;
   means for reading out of said input memory a moving array of 9 pixels from three successive rows and three successive columns forming a 9 element window, the pixel at the middle row and middle column being termed a center pixel, and the other pixels being termed neighbor pixels;
   means, initially reset, for indicating if a first value pixel is deleted in said input memory;

means for moving said window through a cycle of four passes relative to said input memory in the following manner: first through successive columns in one direction with the center pixel remaining in one row then through the same column s in the same direction with the center pixel remaining in the next successive row, etc., second through successive columns in the opposite direction with the center pixel remaining in one row then through the same columns in said opposite direction with the center pixel remaining in the next successive row, etc., third through successive rows in one direction with the center pixel remaining in one column then through the same rows in the same direction with the center pixel remain in the next successive column, etc., fourth through successive rows in the opposite direction with the center pixel remaining in one column then through the same rows in said opposite direction with the center pixel remaining in the next successive column, etc.;

means responsive, at each location of each pass, to said means for reading out for determining if the value of said center pixel is said first value (Q1="yes")or not (Q1="no") and the value of the last pixel, that is the pixel immediately preceding the center pixel in the direction of travel, before alteration, was said second value (Q2="yes") or not (Q2="no") and for determining if the sum of said neighbor pixels is said first value (S1=said first value) or if the sum of unalike pairs of the neighbor is 4times said first value or greater (S2>=4 times said first value);

means responsive to said determining means and to said output memory for writing a 1 value to the center pixel location in said output memory if Q1 is "yes" and Q2 is "yes" and then if S1 is said first value or S2 is equal to or greater than a 4 times said first value and for deleting said center pixel location from input memory if Q1 is "yes" and Q2 is "yes" and S1 is not said first value and S2 is less than 4 times said first value and the value of said output memory at the location or the center pixel has a 0 value and for also setting said initially reset means; and means responsive to said initially reset being set and to said cycling means having completed a cycle for causing said cycling means to recycle;

whereby when said resettable means is reset at the end of a four cycle pass said output memory contains the medial axis of said image.

4. The combination as set forth in claim 3 wherein said means for reading out of said input memory comprises a buffer, said buffer comprising in series, first, second, and third latches, a first-in-first-out buffer of length N−3, where N is the number of columns in said input memory, fourth and fifth latches, and a latch holding said last value of latch 5 and further comprising in series, a sixth latch, a second first-in-first-out buffer of length N−3, seventh, eighth, and ninth latches, said first latching being coupled to receive information supplied from successive locations in said memory, said latch 5 corresponding to said center pixel, said sixth latch coupled to receive data produced by said means responsive to said determining means.

* * * * *